US007545820B2

(12) United States Patent　　　　　(10) Patent No.: US 7,545,820 B2
Duvvury　　　　　　　　　　　　　　　　(45) Date of Patent: *Jun. 9, 2009

(54) APPARATUS AND METHOD FOR AUTOMATIC CLUSTER NETWORK DEVICE ADDRESS ASSIGNMENT

(75) Inventor: Murali Duvvury, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 11/137,889

(22) Filed: May 25, 2005

(65) Prior Publication Data

US 2005/0213560 A1　　Sep. 29, 2005

Related U.S. Application Data

(63) Continuation of application No. 09/452,284, filed on Nov. 30, 1999, now Pat. No. 6,917,626.

(51) Int. Cl.
　　*H04L 12/56*　　(2006.01)
(52) U.S. Cl. .................. 370/401; 370/392; 709/245
(58) Field of Classification Search ........... 370/400, 370/401, 389, 392, 475; 709/223, 245
See application file for complete search history.

(56) References Cited

U.S. PATENT DOCUMENTS

| | | | | |
|---|---|---|---|---|
| 4,644,532 A | 2/1987 | George et al. | ............... | 370/94 |
| 4,922,486 A | 5/1990 | Lidinsky et al. | ............... | 370/60 |
| 4,933,937 A | 6/1990 | Konishi | ............... | 370/85.13 |
| 4,962,497 A | 10/1990 | Ferenc et al. | ............... | 370/60.1 |
| 5,095,480 A | 3/1992 | Fenner | ............... | 370/94.1 |
| 5,136,580 A | 8/1992 | Videlock et al. | ............... | 370/60 |
| 5,150,464 A | 9/1992 | Sidhu et al. | | |
| 5,241,682 A | 8/1993 | Bryant et al. | ............... | 395/800 |

(Continued)

OTHER PUBLICATIONS

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

(Continued)

*Primary Examiner*—Brian D Nguyen
(74) *Attorney, Agent, or Firm*—BainwoodHuang

(57) ABSTRACT

A group of network devices, such as Ethernet switches, are logically configured as a single cluster, with one commander device and one or more member devices. Each network device in the cluster contains an embedded HTML server that facilitates configuration and management of the network device via a management station running a Web browser. Each device in the cluster is identified by a unique Universal Resource Locator ("URL"). However, only the cluster commander is required to have a public IP address. The cluster commander automatically assigns private IP addresses to the other devices in the cluster. Network devices in the cluster constantly monitor network traffic on all their ports to detect conflicts between the automatically assigned IP addresses and the IP addresses of network devices outside of the cluster. When a conflict is detected, the cluster commander assigns a different private IP address to the cluster network device that caused the conflict. The process of detecting and correcting IP address conflicts continues continuously to enable the cluster network devices to react automatically to network configuration changes.

15 Claims, 11 Drawing Sheets

U.S. PATENT DOCUMENTS

| | | | | |
|---|---|---|---|---|
| 5,274,631 | A | 12/1993 | Bhardwaj | 370/60 |
| 5,280,480 | A | 1/1994 | Pitt et al. | 370/85.13 |
| 5,287,103 | A | 2/1994 | Kasprzyk et al. | 340/825.52 |
| 5,319,644 | A | 6/1994 | Liang | 370/85.5 |
| 5,371,852 | A | 12/1994 | Attanasio et al. | 395/200 |
| 5,394,402 | A | 2/1995 | Ross | 370/94.1 |
| 5,430,715 | A | 7/1995 | Corbalis et al. | 370/54 |
| 5,519,706 | A * | 5/1996 | Bantz et al. | 455/435.2 |
| 5,526,489 | A | 6/1996 | Nilakantan et al. | 709/228 |
| 5,530,963 | A | 6/1996 | Moore et al. | 395/200.15 |
| 5,594,732 | A | 1/1997 | Bell et al. | 370/401 |
| 5,617,421 | A | 4/1997 | Chin et al. | 370/402 |
| 5,715,394 | A | 2/1998 | Jabs | 395/200.11 |
| 5,758,282 | A * | 5/1998 | Yamashina et al. | 455/428 |
| 5,793,763 | A | 8/1998 | Mayes et al. | 370/389 |
| 5,802,047 | A | 9/1998 | Kinoshita | 370/359 |
| 5,812,529 | A | 9/1998 | Czarnik et al. | 370/245 |
| 5,835,720 | A | 11/1998 | Nelson et al. | 395/200.54 |
| 5,835,725 | A | 11/1998 | Chiang et al. | 395/200.58 |
| 5,854,901 | A | 12/1998 | Cole et al. | 395/200.75 |
| 5,862,348 | A | 1/1999 | Pedersen | 709/229 |
| 5,912,891 | A | 6/1999 | Kanai | 370/395.51 |
| 5,918,016 | A | 6/1999 | Brewer et al. | 395/200.5 |
| 5,968,116 | A | 10/1999 | Day, II et al. | 709/202 |
| 5,991,828 | A | 11/1999 | Horie et al. | 710/8 |
| 6,009,103 | A | 12/1999 | Woundy | 370/401 |
| 6,023,724 | A | 2/2000 | Bhatia et al. | 709/218 |
| 6,026,441 | A | 2/2000 | Ronen | 709/227 |
| 6,055,236 | A | 4/2000 | Nessett et al. | 370/389 |
| 6,091,951 | A | 7/2000 | Sturniolo et al. | 455/432 |
| 6,092,178 | A | 7/2000 | Jindal et al. | 712/27 |
| 6,092,196 | A | 7/2000 | Reiche | 713/200 |
| 6,119,160 | A | 9/2000 | Zhang et al. | 709/224 |
| 6,141,687 | A | 10/2000 | Blair | 709/225 |
| 6,188,691 | B1 | 2/2001 | Barkai et al. | 370/390 |
| 6,266,335 | B1 | 7/2001 | Bhaskaran | 370/399 |
| 6,370,584 | B1 | 4/2002 | Bestavros et al. | 709/238 |
| 6,425,008 | B1 | 7/2002 | Lecheler et al. | 709/224 |
| 6,470,389 | B1 | 10/2002 | Chung et al. | 709/227 |
| 6,480,508 | B1 * | 11/2002 | Mwikalo et al. | 370/475 |
| 6,496,866 | B2 | 12/2002 | Attanasio et al. | 709/239 |
| 6,693,878 | B1 | 2/2004 | Daruwalla et al. | 370/235 |
| 6,810,010 | B1 * | 10/2004 | Matsukawa | 370/219 |

OTHER PUBLICATIONS

"Hot Products & Solutions—IP Address Management: A White Paper", Network Registrar, American Internet Corporation, Bedford, MA, printed from http://www.american.com/ip-mgmt.html, on Jul. 24, 1998.

NAT and Networks, printed from http://www.csn.tu-chemitz.de/~mha/linux-ip-nat/diplom/node4.html, on Sep. 19, 1998.

NAT-PC Webopaedia Definition and Links, 1998, Mecklermedia Corporation, printed from http://webopedia.internet.com/TERM/N/NAT.html, on Sep. 19, 1998, 1 page.

Network Address Translation Information:, printed frm http://www.uq.edu.au/~gadmacka/content/natinformation.htm, on Sep. 19, 1998.

"Regain Confidence and Control Over Your IP Address Infrastructure", Network Registrar, American Internet Corporation, Bedford, MA.

"Three Ways to Manage IP Addresses", PC Magazine: IP Address Management, printed from http://www.zdnet.com/pcmag/features/ipmanage/ip-s2.htm, on Sep. 10, 1998.

* cited by examiner

APPARATUS AND METHOD FOR AUTOMATIC CLUSTER NETWORK DEVICE ADDRESS ASSIGNMENT

CROSS-REFERENCE TO RELATED APPLICATION

This application is a continuation of application Ser. No. 09/452,284, entitled "Apparatus and Method for Automatic Cluster Network Device Address Assignment" by Murali Duvvury, filed on Nov. 30, 1999 and issued as U.S. Pat. No. 6,917,626.

BACKGROUND OF THE INVENTION

1. Field of the Invention

The present invention relates to the field of data communications networks. More particularly, the present invention relates to an apparatus and method for automatic address assignment for network devices in a cluster.

2. Background

A network is a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. The network typically includes a cable that attaches to network interface cards ("NICs") in each of the devices within the network. Users may interact with network-enabled software applications to make a network request, such as to get a file or print on a network printer. The application may also communicate with the network software, which may then interact with the network hardware to transmit information to other devices attached to the network.

A local area network ("LAN") is a network that is located in a relatively small physical area, such as a building, in which computers and other network devices are linked, usually via a wiring-based cabling scheme. A LAN typically includes a shared medium to which workstations attach-and through which they communicate. LANs often use broadcasting methods for data communication, whereby any device on the LAN can transmit a message that all other devices on the LAN then "listen" to. However, only the device or devices to which the message is addressed actually receive the message. Data is typically packaged into frames for transmission on the LAN.

Currently, the most common LAN media is Ethernet, which traditionally has a maximum bandwidth of 10 Mbps. Traditional Ethernet is a half-duplex technology, in which each Ethernet network device checks the network to determine whether data is being transmitted before it transmits, and defers transmission if the network is in use. In spite of transmission deferral, two or more Ethernet network devices can transmit at the same time, which results in a collision. When a collision occurs, the network devices enter a back-off phase and retransmit later.

As more network devices are added to a LAN, they must wait more often before they can begin transmitting, and collisions are more likely to occur because more network devices are trying to transmit. Today, throughput on traditional Ethernet LANs suffers even more due to increased use of network-intensive programs, such as client-server applications, which cause hosts to transmit more often and for longer periods of time.

FIG. 1 is a block diagram illustrating a network connection between a user 10 and a server 20. FIG. 1 is an example which may be consistent with any type of network, including a LAN, a wide area network ("WAN"), or a combination of networks, such as the Internet.

When a user 10 connects to a particular destination, such as a requested web page on a server 20, the connection from the user 10 to the server 20 is typically routed through several routers 12A-12D. Routers are internetworking devices. They are typically used to connect similar and heterogeneous network segments into Internetworks. For example, two LANs may be connected across a dial-up line, across the Integrated Services Digital Network ("ISDN"), or across a leased line via routers. Routers may also be found throughout the Internet. End users may connect to a local Internet Service Provider ("ISP") (not shown).

As the data traffic on a LAN increases, users are affected by longer response times and slower data transfers, because all users attached to the same LAN segment compete for a share of the available bandwidth of the LAN segment (e.g., 10 Mbps in the case of traditional Ethernet). Moreover, LANs commonly experience a steady increase in traffic even if the number of users remains constant, due to increased network usage of software applications using the LAN. Eventually, performance drops below an acceptable level and it becomes necessary to separate the LAN into smaller, more lightly loaded segments.

LANs are becoming increasingly congested and overburdened. In addition to an ever-growing population of network users, several factors have combined to stress the capabilities of traditional LANs, including faster computers, faster operating systems, and more network-intensive software applications.

There are two traditional approaches to relieving LAN congestion. The first is to simply install a faster networking technology, such as FDDI, ATM, or Fast Ethernet. However, these approaches are expensive to implement. The other traditional approach is to use bridges and routers to reduce data traffic between networks. This solution is also relatively expensive both in money and configuration time, and is only effective when inter-segment traffic is minimal. When inter-segment traffic is high, some bridges and routers can become a bottleneck due to their limited processing power. They also require extensive setup and manual configuration in order to maintain their performance. In addition, despite large buffers, packet loss is always a possibility.

Switching is a technology that alleviates congestion in Ethernet, Token Ring, and Fiber Distributed Data Interface (FDDI) and other similar LANs by reducing traffic and increasing bandwidth. LAN switches are designed to work with existing media infrastructures so that they can be installed with minimal disruption of existing networks.

A Media Access Control ("MAC") address is the unique hexadecimal serial number assigned to each Ethernet network device to identify it on the network. With Ethernet devices, this address is permanently set at the time of manufacture. Each network device has a unique MAC address, so that it will be able to receive only the frames that were sent to it. If MAC addresses were not unique, there would be no way to distinguish between two stations. Devices on a network monitor network traffic and search for their own MAC address in each frame to determine whether they should decode it or not. Special circumstances exist for broadcasting to every device on the network.

Ethernet uses variable-length frames of data to transmit information from a source to one or more destinations. Every Ethernet frame has two fields defined as the source and destination addresses, which indicate the MAC addresses of the network devices where a frame originated and where it is ultimately destined, respectively. FIG. 2-A illustrates the structure of an Ethernet frame, as defined by the IEEE. As shown in FIG. 2-A, the Ethernet frame 22 includes a Preamble 24, a Start of Frame Delimiter 26, a Destination Address 28, a Source Address 30, a Length of data field 32, a variable-length Data field 34, a Pad 36, and a Checksum 38. The Preamble 24 is a seven-byte field, with each byte containing the bit pattern 10101010 to allow for clock synchronization between sending and receiving stations (not shown). The Start of Frame Delimiter 26 is a one-byte field containing the bit pattern 10101011 to denote the start of the frame itself. The Destination Address 28 and the Source Address 30 are typically six-byte fields which specify the unique MAC addresses of the receiving and sending stations. Special addresses allow for multicasting to a group of stations and for broadcasting to all stations on the network. The Length of Data field 32 specifies the number of bytes present in the Data field 34, from a minimum of 0 to a maximum of 1500. The Pad field 36 is used to fill out the length of the entire frame 22 to a minimum of 64 bytes when the Data field 34 contains a small number of bytes. Finally, the Checksum field 38 is a 32-bit hash code of the Data field 34, which can used by the receiving station to detect data transmission errors.

In the context of the present invention, the term "switching" refers to a technology in which a network device (known as a switch) connects two or more LAN segments. A switch transmits frames of data from one segment to their destinations on the same or other segments. When a switch begins to operate, it examines the MAC address of the frames that flow through it to build a table of known sources. If the switch determines that the destination of a frame is on the same segment as the source of the frame, it drops, or filters, the frame because there is no need to transmit it. If the switch determines that the destination is on another segment, it transmits the frame onto the destination segment only. Finally, using a technique known as flooding, if the destination segment is unknown, the switch transmits the frame on all segments except the source segment.

Logically, a LAN switch behaves similarly to a bridge, which is a different kind of network device. The primary difference is that switches have higher data throughput than bridges, because their frame forwarding algorithms are typically performed by application-specific integrated circuits ("ASICs") especially designed for that purpose, as opposed to the more general purpose (and relatively slower) microprocessors typically used in bridges. Like bridges, switches are designed to divide a large, unwieldy local network into smaller segments, insulating each segment from local traffic on other segments, thus increasing aggregate bandwidth while still retaining full connectivity. Switches typically have higher port counts than bridges, allowing several-independent data paths through the device. This higher port count also increases the data throughput capabilities of a switch.

Because a switch maintains a table of the source MAC addresses received on every port, it "learns" to which port a station is attached every time the station transmits. Then, each packet that arrives for that station is forwarded only to the correct port, eliminating the waste of bandwidth on the other ports. Since station addresses are relearned every time a station transmits, if stations are relocated the switch will reconfigure its forwarding table immediately upon receiving a transmission from the stations.

Referring now to FIG. 2-B, a block diagram of an -Ethernet switch according to one aspect of the present invention is shown. As shown in FIG. 2-B, Ethernet switch 200 includes a Layer 1 Physical Interface ("PHY") 202, 204, and a Layer 2 Media Access Control Interface ("MAC") 206, 208, for each port on the Ethernet switch 200. A network interface card ("NIC") consists of a MAC and a PHY. An Ethernet switch also contains a MAC and PHY on every port. Thus, an Ethernet switch may appear to a network as multiple NICs coupled together. Each switch PHY 202, 204, receives the incoming data bit stream and passes it to its corresponding MAC 206, 208, which reassembles the original Ethernet frames.

Ethernet switch 200 also includes a frame buffer memory 210, 212, for each port, a source address table memory 220, discovery protocol logic 230, learning logic 240, forwarding logic 250, packet redirection logic 260, and a configuration and management interface 270. During operation, the learning logic 240 will look at the source address ("SA") within a received Ethernet frame and populate the Source Address Table ("SAT") memory 220 with three columns: MAC address 280, port number 282, and age 284. The MAC address is the same as the source address that a sender has embedded into the frame. The age item will be a date stamp to indicate when the last frame was received from a particular MAC SA. In the example shown in FIG. 2-B, the port number may be 1 or 2. The SAT is also known as the Switch Forwarding Table ("SFT").

Forwarding logic 250 examines at the destination address ("DA") of a received Ethernet frame. This now becomes the new MAC address, which is then compared with the entries in the SAT. Four different forwarding options are possible. If the destination address is a specific address, known as a "broadcast" address, the frame is destined for all ports on the network. In this case, the Ethernet switch will forward the frame to all ports, except the one on which the frame was received. A broadcast address is six bytes with all ones, or "FF.FF.FF.FF.FF.FF" in hexadecimal notation. If the MAC address is found in the SAT and the corresponding port number is different from the received port, the frame is forwarded to that particular port number only. If the MAC address is found in the SAT and the port number is the same as the received port number, the frame is not forwarded; instead, it is discarded. This is known as. "filtering." The frame is discarded because the transmitting station and the receiving station are connected on the same shared LAN segment on that particular port and the receiver has already tuned into the frame. If the MAC address is not found in the table, the frame is forwarded to all ports. The reason a particular destination address is not present in the SAT table is that the receiving device could be new on the network, or the recipient has been very quiet (has not recently sent a frame). In both cases, the bridge SAT will not have a current entry. Flooding the frame on all ports is the brute way of ensuring that the frame is routed to its intended recipient.

Ethernet switch 200 uses the "age" entry in the SAT to determine whether that MAC address is still in use on the LAN. If the age has exceeded a certain preset value, the entry is removed. This conserves memory space and makes the bridge faster because fewer entries need to be scanned for address matching. Finally, the frame buffer memories 210, 212 will store frames on each port in case there is a backlog of frames to be forwarded.

According to embodiments of the present invention, discovery protocol logic 230 receives, processes, and sends Cisco Discovery Protocol ("CDP") or other discovery protocol packets to neighboring network devices on the network. Packet redirection logic 260 examines the source and destination addresses of Ethernet packets under control of the configuration and management interface 270 and forwards them to other network devices in a cluster configuration. As known to those skilled in the art, the program code corresponding to discovery protocol logic 230, learning logic 240, forwarding logic 250, packet redirection logic 260, configuration and management interface 270, and other necessary functions may all be stored on a computer-readable medium. Depending on each particular application, computer-readable media suitable for this purpose may include, without limitation, floppy diskettes, hard drives, RAM, ROM, EEPROM, nonvolatile RAM, or flash memory.

An Ethernet LAN switch improves bandwidth by separating collision domains and selectively forwarding traffic to the appropriate segments. FIG. 3 illustrates the topology of a typical Ethernet network 40 in which a LAN switch 42 has been installed. With reference now to FIG. 3, exemplary Ethernet network 40 includes a LAN switch 42. As shown in FIG. 3, LAN switch 42 has five ports: 44, 46, 48, 50, and 52. The first port 44 is connected to LAN segment 54. The second port 46 is connected to LAN segment 56. The third port 48 is connected to LAN segment 58. The fourth port 50 is connected to LAN segment 60. The fifth port 52 is connected to LAN segment 62. The Ethernet network 40 also includes a plurality of servers 64-A-64-C and a plurality of clients 66-A-66-K, each of which is attached to one of the LAN segments 54, 56, 58, 60, or 62. If server 64-A on port 44 needs to transmit to client 66-D on port 46, the LAN switch 42 forwards Ethernet frames from port 44 to port 46, thus sparing ports 48, 50, and 52 from frames destined for client 66-D. If server 64-C needs to send data to client 66-J at the same time that server 64-A sends data to client 66-D, it can do so because the LAN switch can forward frames from port 48 to port 50 at the same time it is forwarding frames from port 44 to port 46. If server 64-A on port 44 needs to send data to client 66-C, which is also connected to port 44, the LAN switch 42 does not need to forward any frames.

Performance improves in LANs in which LAN switches are installed because the LAN switch creates isolated collision domains. Thus, by spreading users over several collision domains, collisions are avoided and performance improves. In addition, many LAN switch installations dedicate certain ports to a single users, giving those users an effective bandwidth of 10 Mbps when using traditional Ethernet.

As a LAN grows, either due to additional users or network devices, additional switches must often be added to the LAN and connected together to provide more ports and new network segments. One way to connect multiple LAN switches together is to cascade them using high-speed ports. However, when cascading LAN switches, the interswitch bandwidth is limited by the number of connections between switches.

Referring now to FIG. 4, two LAN switches 70-A and 70-B are shown, connected in a cascaded configuration. As shown, each of the LAN switches 70-A and 70-B contains eight ports, 72-A-72-H and 74-A-74-H. On each of the LAN switches 70-A and 70-B, four ports 72-A-72-D and 74-A-74-D are connected to computer workstations 76-A-76-D and 76-E-76-H, respectively. The other four ports on each LAN switch (i.e., ports 72-E-72-H on LAN switch 70-A, and ports 74-E-74-H on LAN switch 70-B) are dedicated to interswitch communication. For example, if each of the four interswitch connections is capable of supporting a 100 Mbps Fast Ethernet channel, the aggregate interswitch communication rate of the switches connected as shown in FIG. 4 is 400 Mbps. However, the total number of ports available for connecting to workstations or other network devices on each LAN switch is diminished due to the dedicated interswitch connections that are necessary to implement the cascaded configuration.

As a LAN grows, network devices are typically added to the LAN and interconnected according to the needs of the particular LAN to which they belong. For example, FIG. 5 illustrates an exemplary group of network devices in a LAN 78, and the interconnections between the network devices in the LAN 78. As shown in FIG. 5, the LAN 78 includes seven network devices: six LAN switches 80-A-80-F and a router 82. Each network device is connected to one or more of the other network devices in the LAN 78. Computer workstations, network printers and other network devices are also connected to the LAN 78, but not shown. It is to be understood that the LAN configuration shown in FIG. 5 is exemplary only, and not in any way limiting.

Regardless of the method used to interconnect them, network devices such as LAN switches need to be configured and managed, because they typically include a number of programmable features that can be changed by a network administrator for optimal performance in a particular network. Without limitation, such features typically include whether each port on the network device is enabled or disabled, the data transmission speed setting on each port, and the duplex setting on each port. Many commercially-available network devices contain embedded HTML Web servers, which allow the network device to be configured and managed remotely via a Web browser.

Traditionally, network device installation includes inserting the device into the network and assigning it an-Internet Protocol ("IP") address, which is a 32-bit number assigned to hosts that want to participate in a TCP/IP Internet. The IP address of a network device is a unique address that specifies the logical location of a host or client on the Internet.

Once a network device has been assigned an IP address, a network administrator can enter the device's IP address or URL into a Web browser such as Netscape Navigator™, available from Netscape Communications Corp. of Mountain View, Calif., or Internet Explorer™, available from Microsoft Corporation of Redmond, Wash., to access the network device and configure it from anywhere in the Internet. However, each network device to be configured must have its own IP address, which must be registered with a domain name service ("DNS"). Assigning an IP address to each and every network device is undesirable, because registering IP addresses with a DNS is both costly and cumbersome.

Accordingly, it would be convenient for a network administrator to be able to assign a single IP address to one network device in a cluster, and then to be able to configure and manage all of the network devices in the cluster using this single IP address. Unfortunately, no current mechanism exists to enable this activity. Accordingly, it is an object of the present invention to provide a method and apparatus which permits an entire cluster of network devices to share a single IP address, and to provide a commander device which automatically assigns private IP addresses to other-network devices in the cluster. Another object of the present invention is to facilitate communication between the commander device and other cluster network devices without having to explicitly assign IP addresses to network devices in the cluster.

SUMMARY OF THE INVENTION

A group of network devices, such as Ethernet switches, are logically configured as a single cluster, with one commander device and one or more member devices. Each network device in the cluster contains an embedded HTML server that facilitates configuration and management of the network device via a management station running a Web browser.

Each device in the cluster is identified by a unique Universal Resource Locator ("URL"). However, only the cluster commander is required to have a public IP address. The cluster commander automatically assigns private IP addresses to the other devices in the cluster. Network devices in the cluster constantly monitor network traffic on all their ports to detect conflicts-between the automatically assigned IP addresses and the IP addresses of network devices outside of the cluster. When a conflict is detected, the cluster commander assigns a different private IP address to the cluster network device that caused the conflict. The process of detecting and correcting IP address conflicts continues continuously to enable the cluster network devices to react automatically to network configuration changes.

BRIEF DESCRIPTION OF THE DRAWINGS

FIG. 2-B is a block diagram of an Ethernet switch in accordance with one aspect of the present invention.

DETAILED DESCRIPTION OF THE PREFERRED EMBODIMENTS

Figure 1:
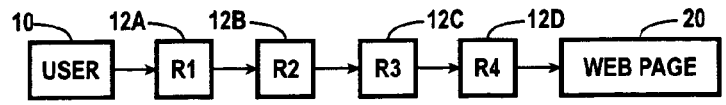
FIG. 1 is a block diagram of an exemplary network connection between a user and a server.
Figure 2A:
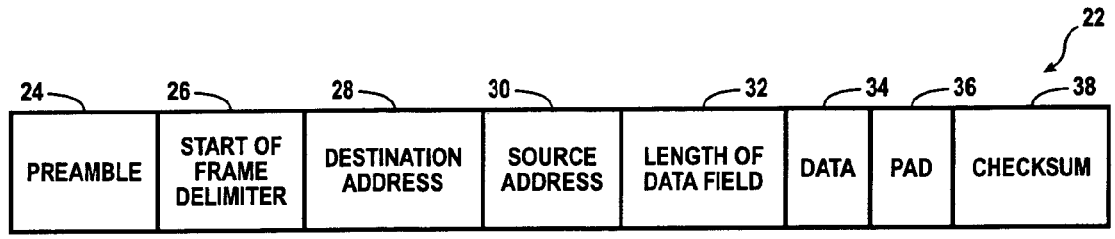
FIG. 2-A is a diagram illustrating the structure of an Ethernet data frame.
Figure 2B:
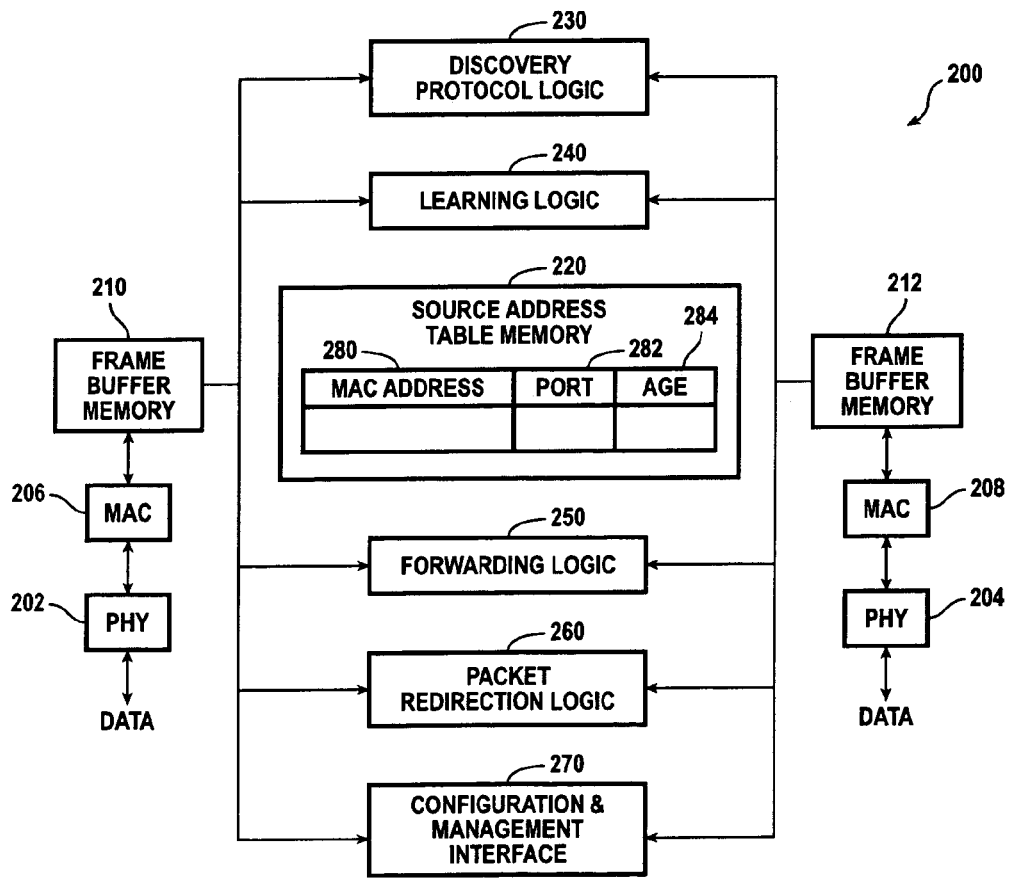
Figure 3:
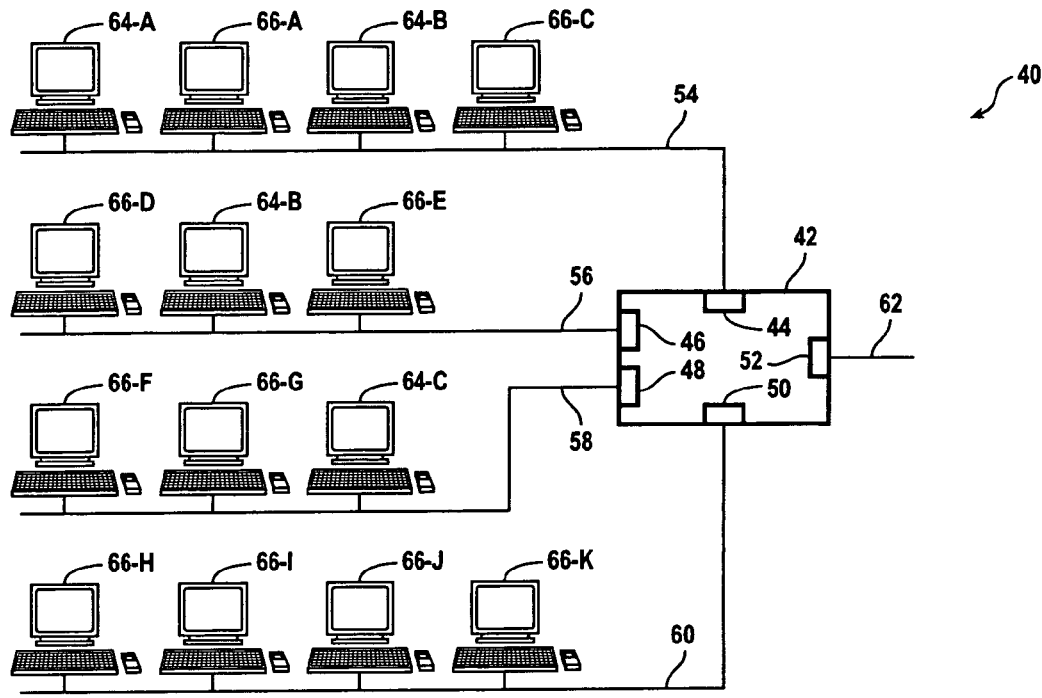
FIG. 3 is a block diagram illustrating the topology of an exemplary LAN incorporating a LAN switch.
Figure 4:
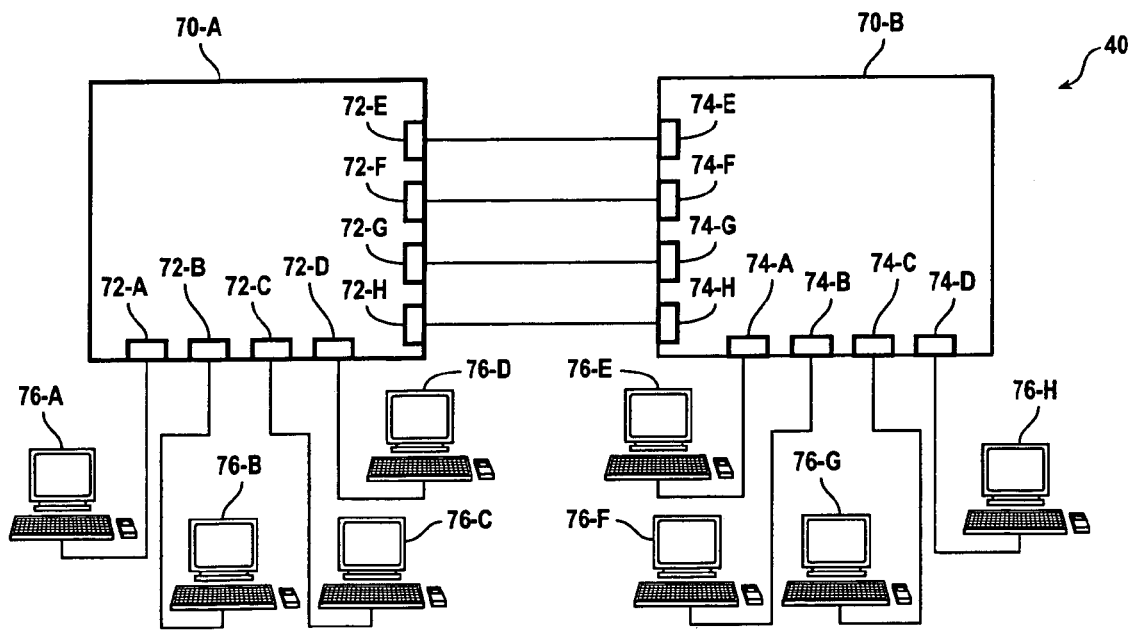
FIG. 4 is a block diagram illustrating an exemplary LAN with two LAN switches interconnected in a cascaded configuration.
Figure 5:
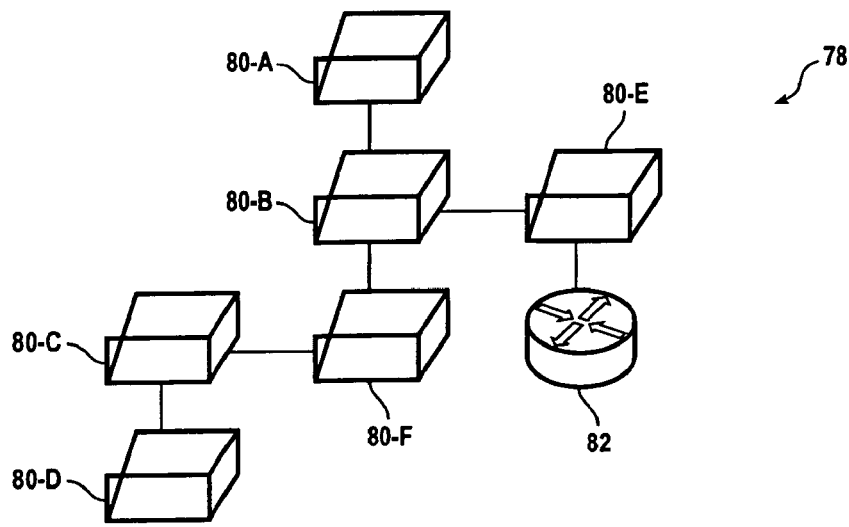
FIG. 5 is a block diagram illustrating the topology of an exemplary LAN incorporating six LAN switches and a router.

Those of ordinary skill in the art will realize that the following description of the present invention is illustrative only and not in any way limiting. Other embodiments of the invention will readily suggest themselves to such skilled persons having the benefit of this disclosure.

Network devices, such as LAN switches, may be configured and managed using either out-of-band or in-band techniques. Out-of-band configuration and management are typically performed by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using an SNMP-compatible network management application and the network device's Management Interface Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB.

Embodiments of the present invention use a subset of the Transmission Control Protocol/Internet Protocol ("TCP/IP") suite as the underlying mechanism to transport the SNMP configuration and management data. Without limitation, the protocols implemented in embodiments of the present invention include the Internet Protocol ("IP"), the Internet Control Message Protocol. ("ICMP"), the User Datagram Protocol ("UDP"), the Trivial File Transfer Protocol ("TFTP"), the Bootstrap Protocol ("BOOTP"), the Address Resolution Protocol ("ARP"), and the Reverse Address Resolution ProtocoL ("RARP").

The Management Information Base("MIB") variables of network devices according to embodiments of the present invention are accessible through SNMP. SNMP is an application-layer protocol designed to facilitate the exchange of management information between network devices. SNMP is used to monitor IP gateways and their networks, and defines a set of variables that the gateway must keep and specifies that all operations on the gateway are a side effect of fetching or storing to data variables. SNMP consists of three parts: a Structure of Management Information ("SMI"), a Management Information Base ("MIB") and the protocol itself. The SMI and MIB define and store the set of managed entities, while SNMP itself conveys information to and from the SMI and the MIB.

Instead of defining a large set of commands, SNMP places all operations in a get-request, get-next-request, and set-request format. For example, an SNMP manager can get a value from an SNMP agent or store a value into that SNMP agent. The SNMP manager can be part of a network management system ("NMS"), and the SNMP agent can reside on a networking device such as a LAN switch. The switch MIB files may be compiled with network management software, which then permits the SNMP agent to respond to MIB-related queries being sent by the NMS.

An example of an NMS is the CiscoWorks™ network management software, available from Cisco Systems, Inc. of San Jose, Calif. CiscoWorks™ uses the switch MIB variables to set device variables and to poll devices on the network for specific information. Among other tasks, the CiscoWorks™ software permits the results of a poll to be displayed as a graph and analyzed in order to troubleshoot internetworking problems, increase network performance, verify the configuration of devices, and monitor traffic loads. Other products known to those of ordinary skill in the art, available from several other vendors, provide similar functionality.

Figure 6:
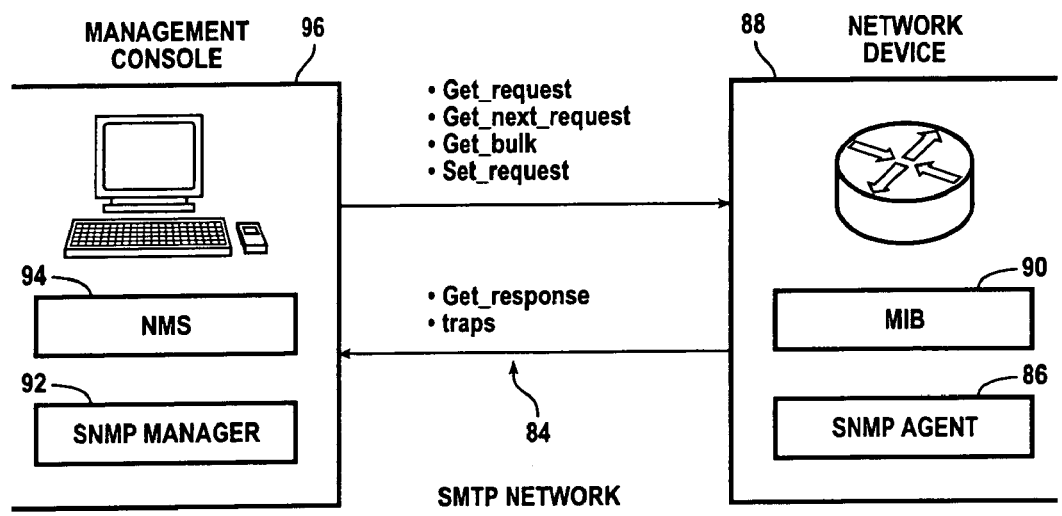
FIG. 6 is a block diagram illustrating an exemplary SNMP network.

Referring now to FIG. 6, an exemplary SNMP network 84 is shown. The SNMP agent 86 in network device 88 gathers data from the MIB 90, also in network device 88. The MIB 90 is the repository for information about device parameters and network data. The SNMP agent 86 can send traps, or notification of certain events, to the SNMP manager 92, which is part of the Network Management Software ("NMS") 94 running on the management console 96. The SNMP manager 92 uses information in the MIB 90 to perform the operations described in Table 1.

TABLE 1

SNMP Manager Operations

| Operation | Description |
| --- | --- |
| Get-request | Retrieve a value from a specific variable. |
| Get-next-request | Retrieve a value from a variable within a table. With this operation, an SNMP manager does not need to know the exact variable name. A sequential search is performed to find the needed variable within a table. |
| Get-response | The reply to a get-request, get-next-request, and set-request sent by an NMS. |
| Set-request | Store a value in a specific variable. |
| trap | An unsolicited message sent by an SNMP agent to an SNMP manager indicating that some event has occurred. |

Embodiments of the present invention support the following configuration and management interfaces: HTML (web-based) interfaces, SNMP, and a proprietary Internet Operating System ("IOS") command line interpreter ("CLI"). Each of these management interfaces can be used to monitor and configure a LAN switch or a group of switches, known as a cluster. The cluster management tools are web-based, and may be accessed via an ordinary browser, such as Netscape Navigator™ or Microsoft Internet Explorer™. Embedded HTML-based management tools display images of switches and graphical user interfaces.

Figure 7:
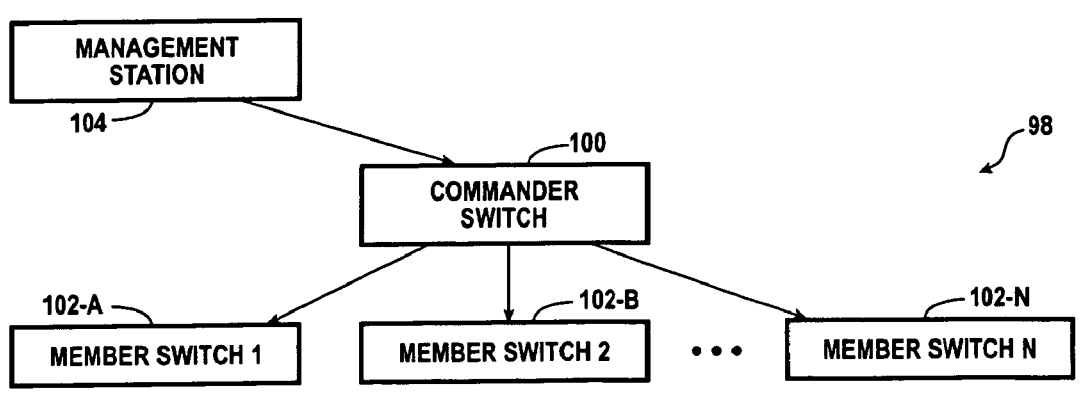
FIG. 7 is a block diagram illustrating a cluster of network devices according to one aspect of the present invention.

When LAN switches are grouped into clusters, one switch is called the commander switch, and the other switches are called member switches. Referring now to FIG. 7, an exemplary switch cluster 98 is shown which includes a commander switch 100 and one or more member switches 102-A-102-N. Management station 104 is connected to the commander switch 100, which redirects configuration requests to the member switches 102-A-102-N.

According to the present invention, a single IP address for the entire cluster 98 is assigned to the commander switch 100, which distributes configuration information to the other switches in the cluster. In one embodiment, a cluster with up to 15 member switches may be configured and managed via the IP address of the commander switch 100. The member switches 102-A-102-N in the cluster do not need individual IP addresses, and may be managed through the IP address of the commander switch. However, if so desired (e.g., if IP addresses are available), any of member switches 102-A-102-N may be assigned its own IP address as well. In such a case, a member switch may be configured and managed either through the IP address of the commander switch or through its own IP address.

According to embodiments of the present invention, the web-based management features are based on an embedded HTML web site within the Flash memory of each network device in the cluster. Web-based management uses the Hypertext Transfer Protocol ("HTTP"), an in-band form of communication, which means that the Web-based management features of the network device are accessed through one of the Ethernet ports that are also used to receive and transmit normal data in each network device.

HTTP is an application-level protocol for distributed, collaborative, hypermedia information systems. HTTP allows an open-ended set of methods that indicate the purpose of a request. It builds on the discipline of reference provided by the Uniform Resource Identifier ("URI"), as a location ("URL") or name ("URN"), for indicating the resource to which a method is to be applied. Messages are passed in a format similar to that used by Internet mail as defined by the Multipurpose Internet Mail Extensions ("MIME").

Forming a Cluster of Network Devices

Figure 8:
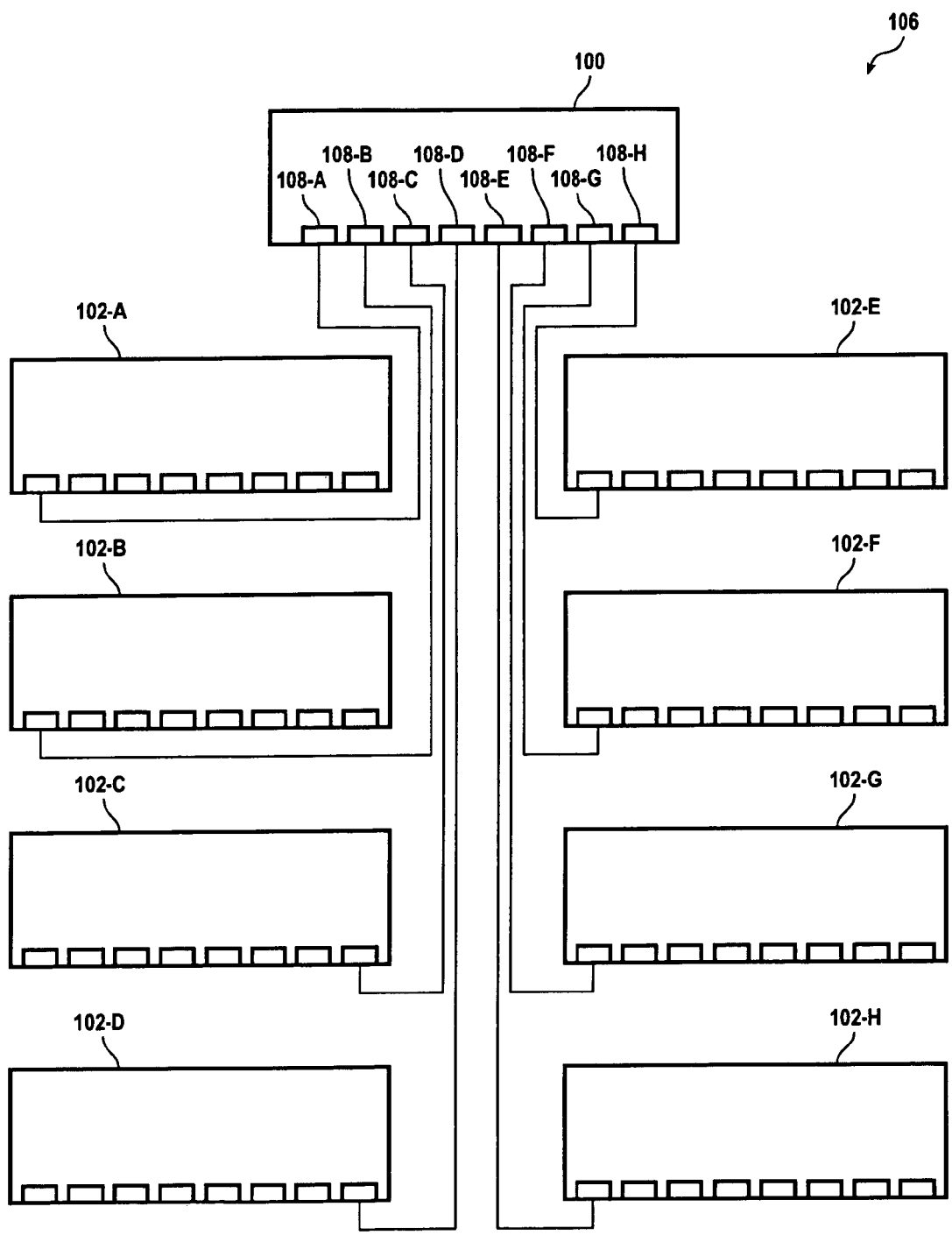
FIG. 8 is a block diagram illustrating a cluster of network devices in a star configuration according to one aspect of the present invention.

According to aspects of the present invention, a cluster is a group of connected network devices such as LAN switches that are managed as a single entity. The switches can be in the same location, or they can be distributed across a network. According to one embodiment of the present invention, all communication with cluster switches is through a single IP address assigned to the commander switch. Clusters may be configured in a variety of topologies. As an example, FIG. 8 illustrates a switch cluster 106 configured in a "star," or "radial stack," topology. In this configuration, each of the eight member switches 102-A-102-H in cluster 106 is directly connected to one of the ports 108A-108-H of commander switch 100.

Figure 9:
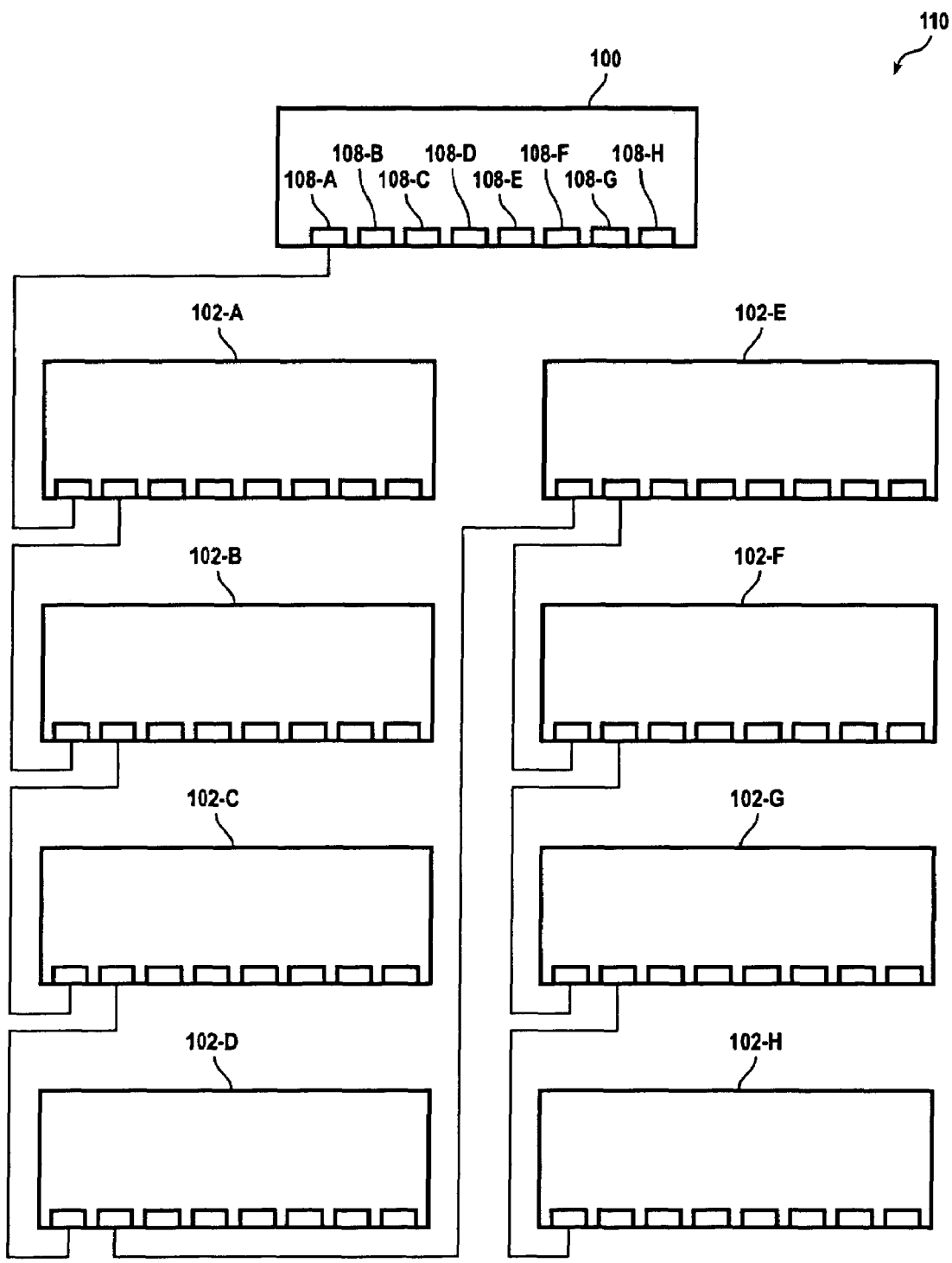
FIG. 9 is a block diagram illustrating a cluster of network devices in a daisy chain configuration according to one aspect of the present invention.

A second example of a cluster configuration, known as a "daisy chain" configuration, is shown in FIG. 9. In cluster 110, only member switch 102-A is directly connected to the commander switch 100. Member switches 102-B-102-G are each connected to an "upstream" switch (one that is fewer "hops" away from commander switch 100) and to a "downstream" switch (one that is more "hops" away from commander switch 100). Finally, the last switch in the chain (member switch 102-H) is only connected to its upstream "neighbor" 102-G.

Figure 10:
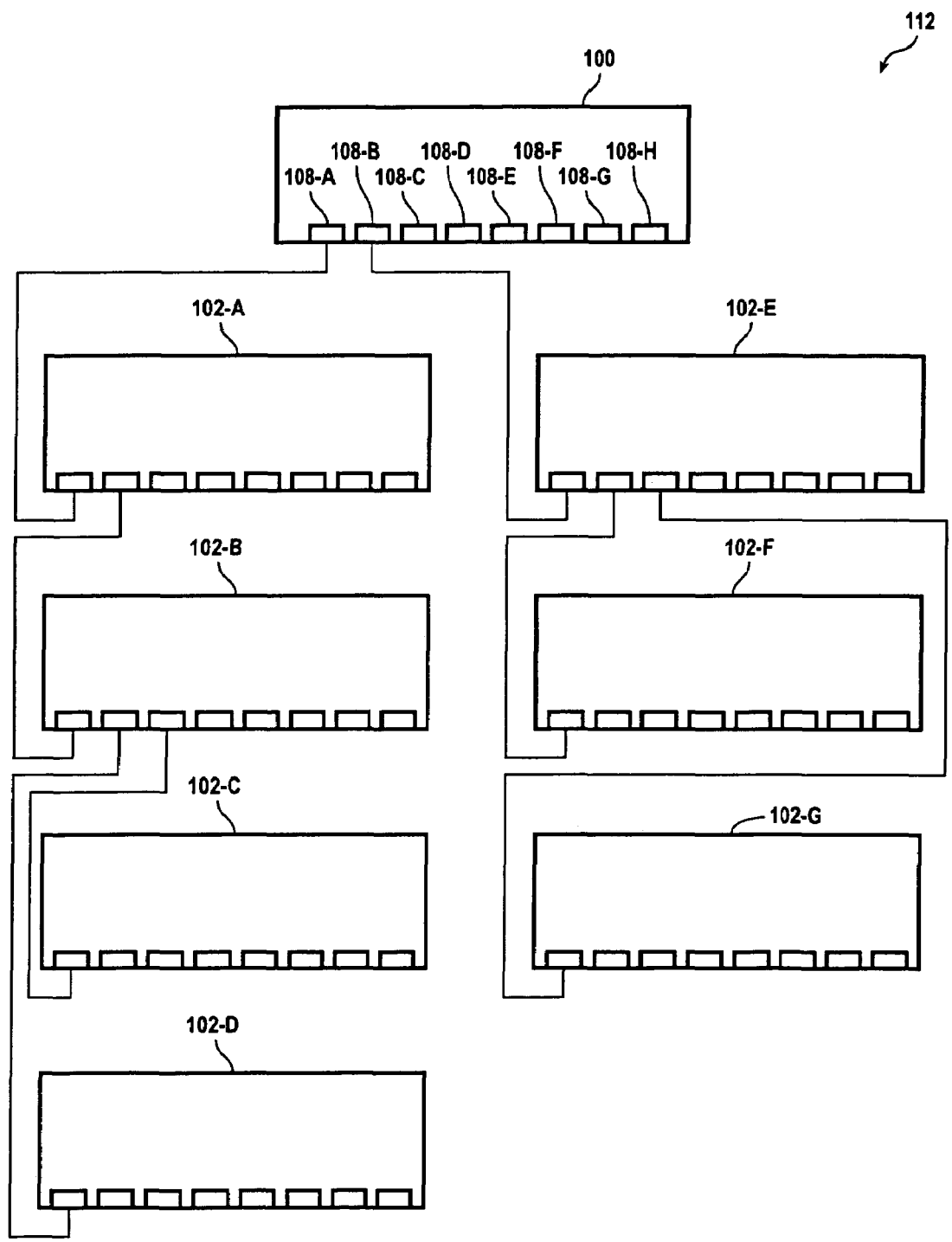
FIG. 10 is a block diagram illustrating a cluster of network devices in a hybrid configuration according to one aspect of the present invention.

As a third example, FIG. 10 illustrates a "hybrid" cluster configuration with one commander switch 100 and seven member switches 102-A-102-G. In cluster 112, member switches 102-A and 102-E are in a star configuration with respect to commander switch 100. Member switch 102-B is in a daisy chain configuration with respect to member switch 102-A, while member switches 102-C and 102-D are in a star configuration with respect to member switch 102-B. Finally, member switches 102-F and 102-G are in a star configuration with respect to member switch 102-E. Thus, hybrid cluster 112 as shown in FIG. 10 consists of a combination of star and daisy chain configurations.

It is to be understood that many more cluster configurations are possible, and that the above examples are not in any way limiting.

The commander switch is the single point of access used to configure and monitor all the switches in a cluster. According to one embodiment of the present invention, member switches are managed through a commander switch. The commander switch is used to manage the cluster, and is managed directly by the network management station. Member switches operate under the control of the commander. While it is a part of a cluster, a member switch is not managed directly, unless it has been assigned its own IP address, as mentioned earlier. Rather, requests intended for a member switch are first sent to the commander, then forwarded to the appropriate member switch in the cluster.

When switches are first installed, they are cabled together according to the network configuration desired for a particular application, and an IP address is assigned to the commander switch. In addition, the commander switch must be enabled as the commander switch of the cluster. Once the commander switch has been enabled, it can use information known about the network topology to identify other network devices in the network that may be added to the cluster. According to one embodiment of the present invention, the commander switch uses the Cisco™ Discovery Protocol ("CDP") to automatically identify candidate network devices. However, other similar products known to those of ordinary skill in the art are available from other vendors to accomplish the same task. Alternatively, discovery of candidate network devices may be performed manually by inspecting the network topology and the network devices attached to the network.

CDP is a media-independent device discovery protocol which can be used by a network administrator to view information about other network devices directly attached to a particular network device. In addition, network management applications can retrieve the device type and SNMP-agent address of neighboring network devices. This enables applications to send SNMP queries to neighboring devices. CDP thus allows network management applications to discover devices that are neighbors of already known devices, such as neighbors running lower-layer, transparent protocols.

It is to be understood that the present invention is not limited to devices that are compatible with CDP. CDP runs on all media that support the Subnetwork Access Protocol ("SNAP"), including LAN and Frame Relay. CDP runs over the data link layer only. Each network device sends periodic messages to a multicast address and listens to the periodic messages sent by others in order to learn about neighboring devices and determine when their interfaces to the media go up or down. Each device also advertises at least one address at which it can receive SNMP messages. The advertisements contain holdtime information, which indicates the period of time a receiving device should hold CDP information from a neighbor before discarding it. With CDP, network management applications can learn the device type and the SNMP agent address of neighboring devices. This process enables applications to send SNMP queries to neighboring devices.

Once a switch cluster is formed, any of the switches in the cluster may be accessed by entering the IP address of the commander switch into a Web browser. The single password that is entered to log in to the commander switch also grants access to all the member switches in the cluster.

The method of creating a cluster of Ethernet switches depends on each particular network configuration. If the switches are arranged in a star topology, as in FIG. 8, with the commander switch at the center, all of the member switches may be added to the cluster at once. On the other hand, if the switches are connected in a daisy-chain topology, as in FIG. 9, the candidate switch that is connected to the commander switch is added first, and then each subsequent switch in the chain is added as it is discovered by CDP. If switches are daisy-chained off a star topology, as in the exemplary hybrid configuration shown in FIG. 10, all the switches that are directly connected to the commander switch may be added first, and then the daisy-chained switches may be added one at a time.

In embodiments of the present invention, there can be a maximum of sixteen switches in a cluster: fifteen member switches and one commander switch. If passwords are defined for the candidate member switches, the network administrator must know them all before they can be added to the cluster. In addition, a candidate switch according to embodiments of the present invention must not already be a member switch or a commander switch of another active cluster.

If the commander switch of a cluster fails, member switches continue forwarding but cannot be managed through the commander switch. Member switches retain the ability to be managed through normal standalone means, such as the console-port CLI, and they can be managed through SNMP, HTML, and Telnet after they have been assigned an IP address. Recovery from a failed command switch can be accomplished by replacing the failed unit with a cluster member or another switch. To have a cluster member ready to replace the commander switch, the network administrator must assign an IP address to another cluster member, and know the command-switch enable password for that switch.

According to embodiments of the present invention, when a cluster is formed, the commander switch automatically changes three parameters on all the member switches in the cluster: the IOS host name, the enable password, and the SNMP community string. If a switch has not been assigned an IOS host name, the commander switch appends a number to the name of the commander switch and assigns it sequentially to the member switches. For example, a commander switch named eng-cluster could name a cluster member switch eng-cluster-5. If an IOS host name has already been assigned to a switch, the switch retains its IOS host name.

Figure 11:
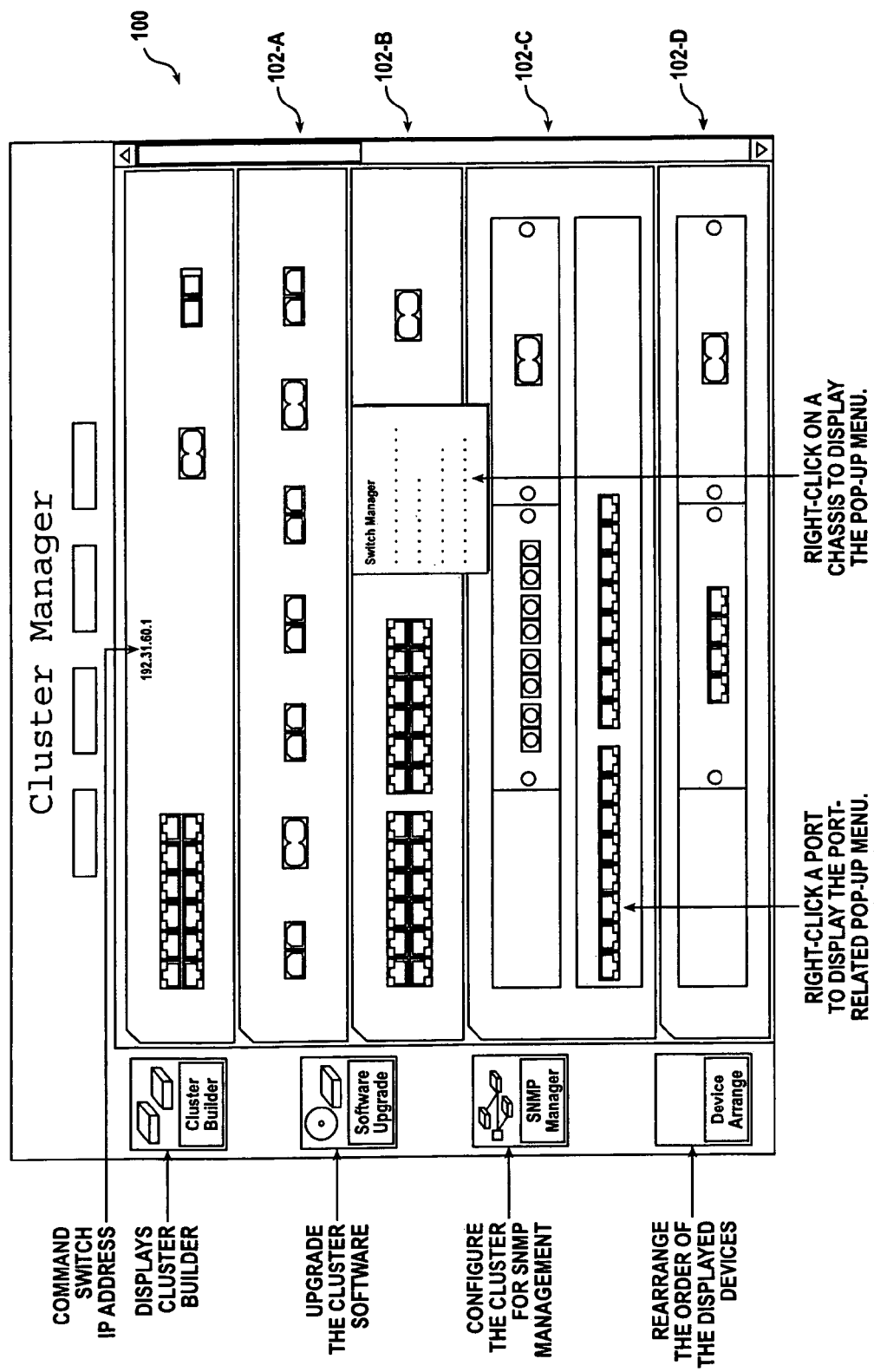
FIG. 11 is a sample configuration screen for a switch cluster according to one aspect of the present invention.

Once a cluster has been created, network management software such as the Cluster Manager™ program, available from the assignee of the present invention, may be used to monitor and configure the switches in the cluster. FIG. 11 shows a switch cluster with one commander switch 100 and four member switches 102-A-102-D as it is displayed on a sample Cluster Manager™ page.

One advantage of the present invention is that a network administrator need set only one IP address, one password, and one system SNMP configuration in order to manage an entire cluster of switches. A cluster can be formed from switches located in several different buildings on a campus, and may be linked by fiber optic, Fast Ethernet, or Gigabit Ethernet connections.

Clusters may be managed from a management station through ASCII terminal consoles, telnet sessions, SNMP management stations and Web Consoles. All configuration and management requests are first directed to the cluster commander. Any required authentication is done by the commander. If necessary, the commander acts as a redirector and forwards requests to the appropriate member switch and forwards the reply to the management station. According to embodiments of the present invention, a member switch can be in only one cluster at a time and can have only one commander.

There is no restriction on the types of connections between a commander switch and member switches. In one embodiment of the present invention, a cluster can be formed for a fully interconnected group of CDP neighbors. A network device can join a cluster when the network device is a CDP neighbor of the cluster. Without limitation, switches in a cluster may be interconnected using 10 Mbps Ethernet, 100 Mbps Fast Ethernet, or 1000 Mbps Gigabit Ethernet.

The primary external configuration and management interface to the cluster is a TCP/IP connection to the commander switch. HTTP, SNMP, and telnet protocols run on top of the IP stack in the operating system. Alternatively, the cluster may also be managed via the console port of the commander.

Thus, as shown in FIG. 7, a Web browser on the management station 104 communicates with the switch cluster 98 by establishing an HTTP connection to the commander switch 100. Special CLI commands help present output from the commander switch 100 to the browser in a format that is easily processed on the browser. Communication between the commander switch 100 and member switches 102-A-102-N is accomplished by the commander switch 100 translating the desired actions into commands the member switches 102-A-102-N would be able to interpret if they were acting as stand-alone switches, i.e., if they were not part of a cluster.

The commander switch 100 manages SNMP communication for all switches in the cluster 98. The commander switch 100 forwards the set and get requests from SNMPN applications to member switches 102-A-102-N, and it forwards traps and other responses from the member switches 102-A-102-N back to the management station 104. In one embodiment of the present invention, read-write and read-only community strings are set up for an entire cluster. Community strings provide authentication in the exchange of SNMP messages. The commander switch appends numbers to the community strings of member switches so that these modified community strings can provide authentication for the member switches. When a new switch is added to the cluster, a community string is created for it from the community string for the cluster. Only the first read-only and read-write community strings are propagated to the cluster.

Figure 12:
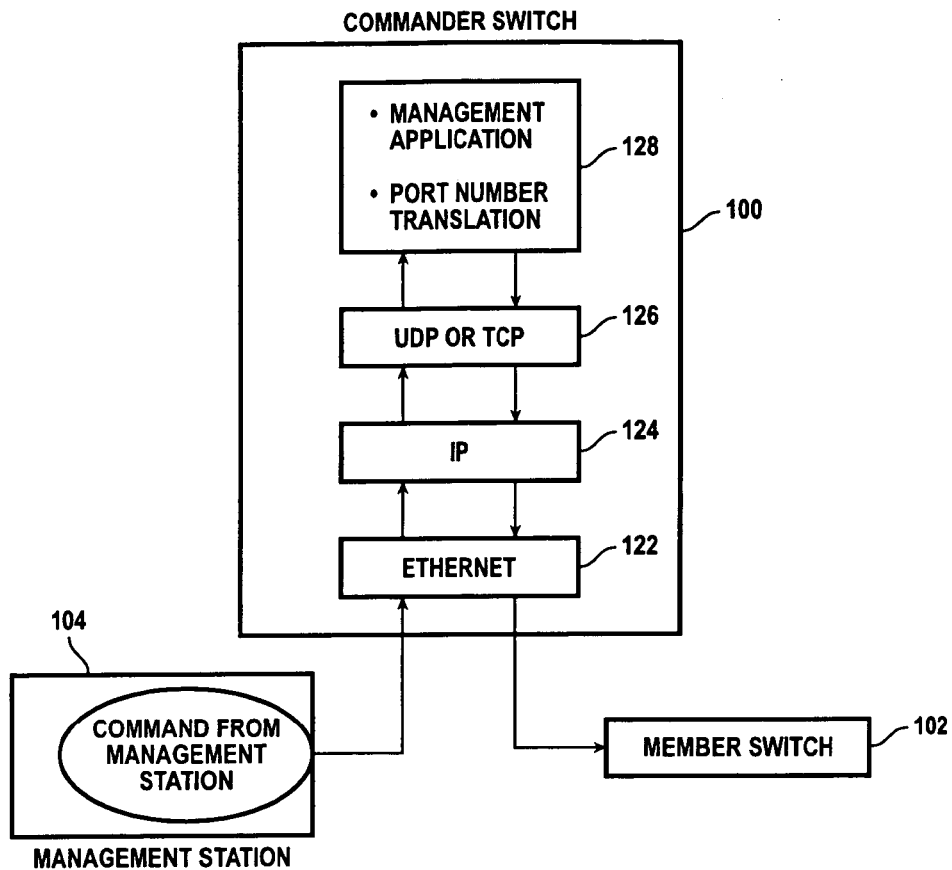
FIG. 12 is a block diagram of configuration data packet processing by a commander device according to one aspect of the present invention.

Configuration and management data packets are sent between the commander 100 and member switches 102-A-102-N via the network connection. The commander 100 identifies each member switch 102-A-102-N by the MAC address of the port on the member switch that is connected to the commander 100. FIG. 12 illustrates in block diagram form how a packet intended for a member switch is processed by the commander. A command from the management station 104 is received by the Ethernet module 122 of the commander switch 100. The command is processed at the IP layer 124, UDP or TCP layer 126, and Management Application layer 128 of the commander switch 100. The Management Application layer 128 determines that the command is intended for member switch 102, and performs redirection by translating the port number in the received command to the appropriate port for member switch 102. The redirected command flows down through the UDP or TCP layer 126, the IP layer 124, and the Ethernet layer 122 of the commander switch 100, and is passed on via Ethernet to the member switch 102.

Cluster Interface

In embodiments of the present invention, Internet Protocol ("IP") is the transport mechanism used to communicate between the commander switch and member switches in a cluster. To distinguish between normal IP packets and the cluster management IP packets, a special SNAP header is used for the cluster management IP packets. In one embodiment of the present invention, private IP addresses ("10.x.y.z") are used for intra-cluster communication. Each cluster member, including the commander, is assigned a private IP address, known as the cluster IP address, or Cluster Management Protocol ("CMP") address. These private IP addresses are maintained internally by the commander.

As described below, when a member switch is added to a cluster, the commander generates a unique cluster IP address and assigns it to the member switch. The commander's cluster IP address is also passed to the member switch. These cluster IP addresses are dynamically assigned. When the commander finds a conflict with one of the assigned cluster IP addresses (such as when some other IP station, not part of the cluster, is using the same IP address as one of the cluster IP addresses), then the commander resolves the conflict by selecting another cluster IP address and assigning it to the corresponding member switch.

In one embodiment of the present invention, both the commander switch and the member switches use CMP addresses to send and receive management data within the cluster. A CMP address is a private IP address in "10.x.y.z" format, where x, y, and z, are integers between 0 and 255. The commander switch automatically generates a CMP address and assigns it to the member switch when the switch first joins the cluster.

Since CMP addresses are automatically generated, there can be conflicts between the IP address used by a cluster network device and the IP address of a network device outside the cluster. For example, some other IP station can be using the same address as an automatically assigned CMP address. Thus, both the commander switch and the member switches constantly check for conflicts, and in case of a conflict a new CMP address is generated.

The commander switch assigns the CMP address to the member switch using the CMP/RARP protocol. CMP/RARP is a variation of the normal RARP (Reverse ARP) protocol. As described below, CMP/RARP uses a different SNAP encapsulation, and it has provisions to carry variable list of cluster parameters as Type Length Value ("TLV") fields.

Figure 13:
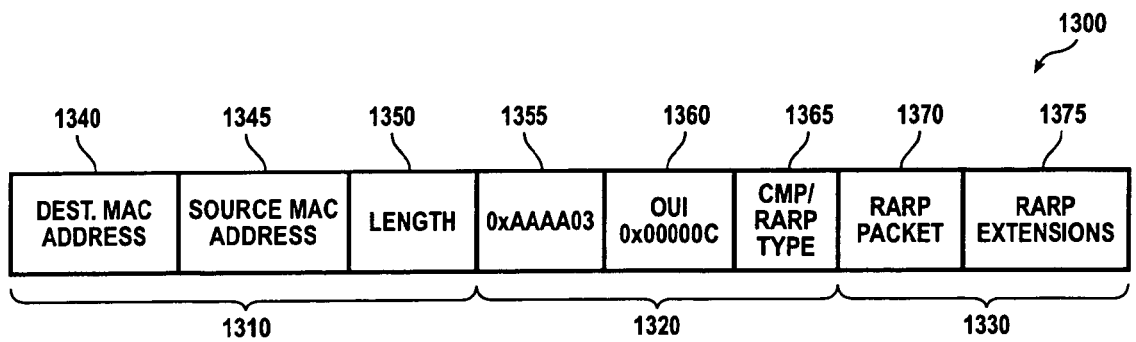
FIG. 13 is a block diagram illustrating the CMP/RARP packet format according to aspects of the present invention.

FIG. 13 is a block diagram illustrating the CMP/RARP packet format according to aspects of the present invention. As shown in FIG. 13, a CMP/RARP packet 1300 comprises an Ethernet header 1310, an LLC/SNAP header 1320, and a RARP portion 1330. As known to those skilled in the art, Ethernet header 1310 comprises a 6-byte destination MAC address 1340, a 6-byte source MAC address 1345, and a 2-byte Length field 1350. LLC/SNAP header 1320 comprises a 3-byte header field 1355 (set to equal 0xAA-AA-03 in one embodiment), a 3-byte OUI field 1360 (set to equal 0x00-00-0C in one embodiment), and a 2-byte CMP/RARP identifier field 1365 (set to equal 0x0114 in one embodiment). RARP portion 1330 of the CMP/RARP packet 1300 comprises a 28-byte RARP packet 1370, described below, and a variable length CMP/RARP extension field 1375.

As shown in FIG. 13, CMP/RARP packets 1300 use a separate SNAP encapsulation 1320 to distinguish them from normal RARP packets. Also, it should be noted that at the end of the CMP/RARP packet, there is a variable length extension field 1375 to pass cluster parameters according to aspects of the present invention.

Figure 14:
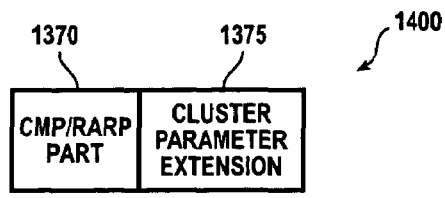
FIG. 14 is a block diagram illustrating a cluster ADD message format according to aspects of the present invention.

FIG. 14 is a block diagram illustrating a cluster ADD message format according to aspects of the present invention. As shown in FIG. 14, a cluster ADD message 1400 is one specific example of a type of cluster message that may be transmitted in the RARP portion 1330 of the CMP/RARP packet 1300 shown in FIG. 13. Referring back to FIG. 14, cluster ADD message 1400 comprises a 28-byte CMP/RARP part 1370 and a variable length cluster-parameter extension part 1375. CMP/RARP part 1370 is used for assigning a CMP address to a cluster member switch, while the cluster parameter extension part 1375 is used to transmit cluster parameters to a member switch. Cluster ADD message 1400 is sent to a member switch when the member switch first joins a cluster.

Figure 15A:
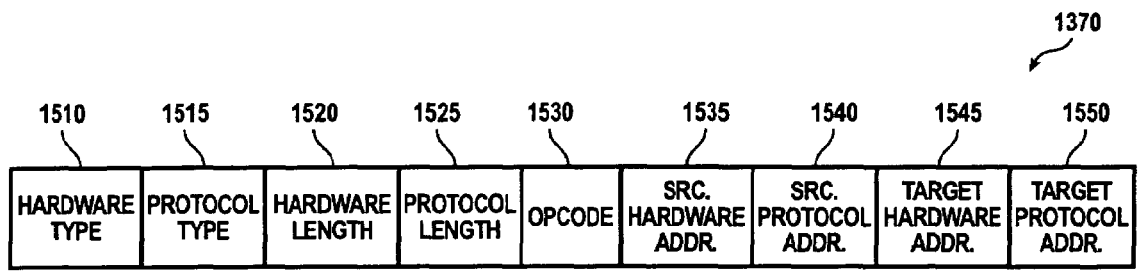
FIG. 15A is a block diagram illustrating the format of the CMP/RARP portion of a cluster ADD message according to aspects of the present invention.

FIG. 15A is a block diagram illustrating the format of the CMP/RARP portion 1370 of a cluster ADD message 1400 according to aspects of the present invention. As shown in FIG. 15, the CMP/RARP portion 1370 has the same format as a regular RARP packet, and comprises a 2-byte Hardware type field 1510 (set to equal 0x0001, i.e., "ethernet type," in one embodiment), a 2-byte protocol field 1515 (set to equal 0x0800, i.e., "IP type," in one embodiment), a 1-byte hardware length field 1520 (set to equal "6," i.e., "ethernet type," in one embodiment), a 1-byte protocol length field 1525 (set to equal "4," i.e., "IP type," in one embodiment), a 2-byte opcode field 1530 (set to equal 0x04, i.e., "RARP reply," in one embodiment), a 6-byte source hardware address field 1535 (which equals the MAC address of the cluster commander switch), a 4-byte source protocol address field 1540 (which equals the CMP address of the commander switch), a 6-byte target hardware address field 1545 (which equals the MAC address of the member switch), and a 4-byte target protocol address field 1550 (which equals the CMP address of the member switch).

Figure 15B:
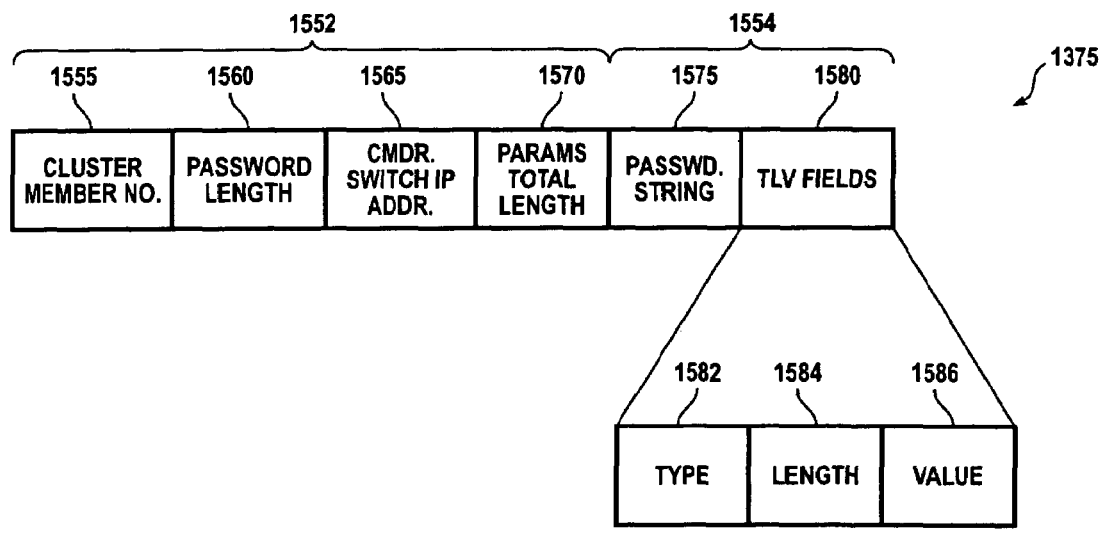
FIG. 15B is a block diagram illustrating the format of the cluster parameter extension portion of a cluster ADD message according to aspects of the present invention.

FIG. 15B is a block diagram illustrating the format of the cluster parameter extension portion 1375- of a cluster ADD message 1400 according to aspects of the present invention. The cluster parameter extension portion 1375 of a cluster ADD message 1400 is used to set cluster parameters on a member switch. As shown in FIG. 15, cluster parameter extension portion 1375 comprises a fixed length portion 1552 and a variable length portion 1554. The fixed length portion 1552 comprises a 2-byte cluster member number field 1555, a 2-byte password length field 1560, a 4-byte command switch management IP address field 1565, and a 4-byte total parameter length field 1570. The variable length portion 1554 comprises a variable length password string field 1575 for authentication, and a variable length list of cluster parameter Type Value Fields ("TLVs") 1580. Each cluster parameter TLV 1580 further comprises a 1-byte cluster parameter type field 1582, a 1-byte cluster parameter length field 1582, and a variable length (up to 255-bytes) cluster parameter value field 1586.

Figure 16:
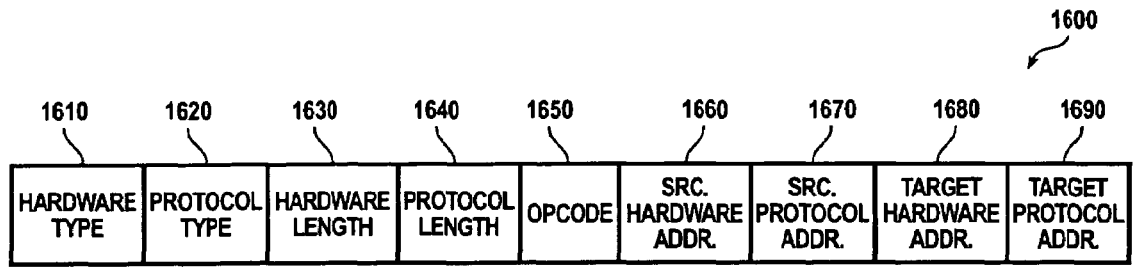
FIG. 16 is a block diagram illustrating the format of an address conflict detection message according to aspects of the present invention.

FIG. 16 is a block diagram illustrating the format of an address conflict detection message 1600 according to aspects of the present invention. This message format is used when a member switch detects a conflict with one of the CMP addresses (either its own address or the commander switch's address). As shown in FIG. 16, address conflict resolution message 1600 comprises a 2-byte hardware type field 1610 (set to equal 0x0001, i.e., "ethernet type," in one embodiment), a 2-byte protocol field 1620 (set to equal 0x0800, i.e., "IP type," in one embodiment), a 1-byte hardware length field 1630 (set to equal "6," i.e., "ethernet type," in one embodiment), a 1-byte protocol length field 1640 (set to equal "4," i.e., "IP type," in one embodiment), a 2-byte opcode field 1650 (set to equal 0x03, i.e., "RARP request," in one embodiment), a 6-byte source hardware address field 1660 (which equals the MAC address of the cluster commander switch), a 4-byte source protocol address field 1670 (which equals 255.255.255.255 if the member switch found a conflict with its own CMP address), a 6-byte target hardware address field 1680 (which equals the MAC address of the member switch), and a 4-byte target protocol address field 1690 (which equals 255.255.255.255 if the member switch found a conflict with the CMP address of the commander switch).

Figure 17:
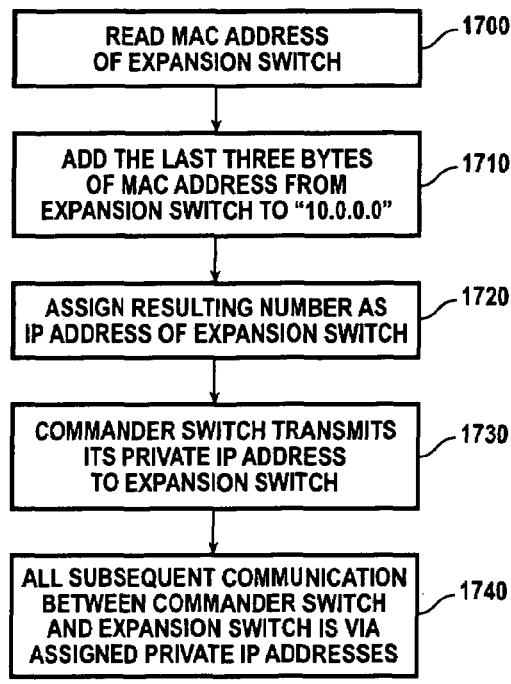
FIG. 17 is a flow chart illustrating an automatic IP address generation algorithm according to one embodiment of the present invention.

FIG. 17 is a flow chart illustrating an automatic IP address generation algorithm according to one embodiment of the present invention. When a member switch first joins a cluster, the commander switch generates a CMP address for the member switch by adding last three bytes of the member switch's MAC address to the number "10.0.0.0." Thus, as shown in FIG. 17, at step 1700 the commander switch reads the MAC address of a member switch from an Ethernet frame received from the member switch. Next, at step 1710, the commander switch adds the last three bytes of the member switch's MAC address to the number "10.0.0.0." Then, at step 1720, the commander switch assigns the resulting number to be the CMP IP address of the member switch. For example, if the MAC address of the member switch is "00-e0-1e-01-02-03," then the generated CMP address will be "10.01.02.03." At step 1730, the commander switch communicates its own CMP address to the member switch. Finally, at step 1740, once a member switch has been assigned a CMP address, the commander switch and the member switch use CMP addresses to communicate with each other.

However, as discussed above, since CMP addresses are dynamically and automatically generated, they are subject to conflicts. To avoid potential conflicts and to correct any conflicts promptly if they occur, once part of a cluster, both the commander switch and member switches constantly monitor for address conflicts. This is done by monitoring all input IP packets destined to each switch and checking whether the source IP address of the input packet matches any of the CMP addresses. If there is a match, then a conflict is declared.

If the conflict is found on a member switch, the member switch informs the command switch about the conflict using the CMP/RARP protocol. The conflict is reported by setting the protocol address field to all '1s' (i.e., "255.255.255.255"). The conflict could be either with a member switch's CMP address or with the commander switch's CMP address. If the conflict is with the commander switch's CMP address, the target protocol address field of the CMP/RARP packet is set to "255.255.255.255." Similarly if the conflict is with the member switch's CMP address, the source protocol address field of the CMP/RARP packet is set to "255.255.255.255."

Figure 18:
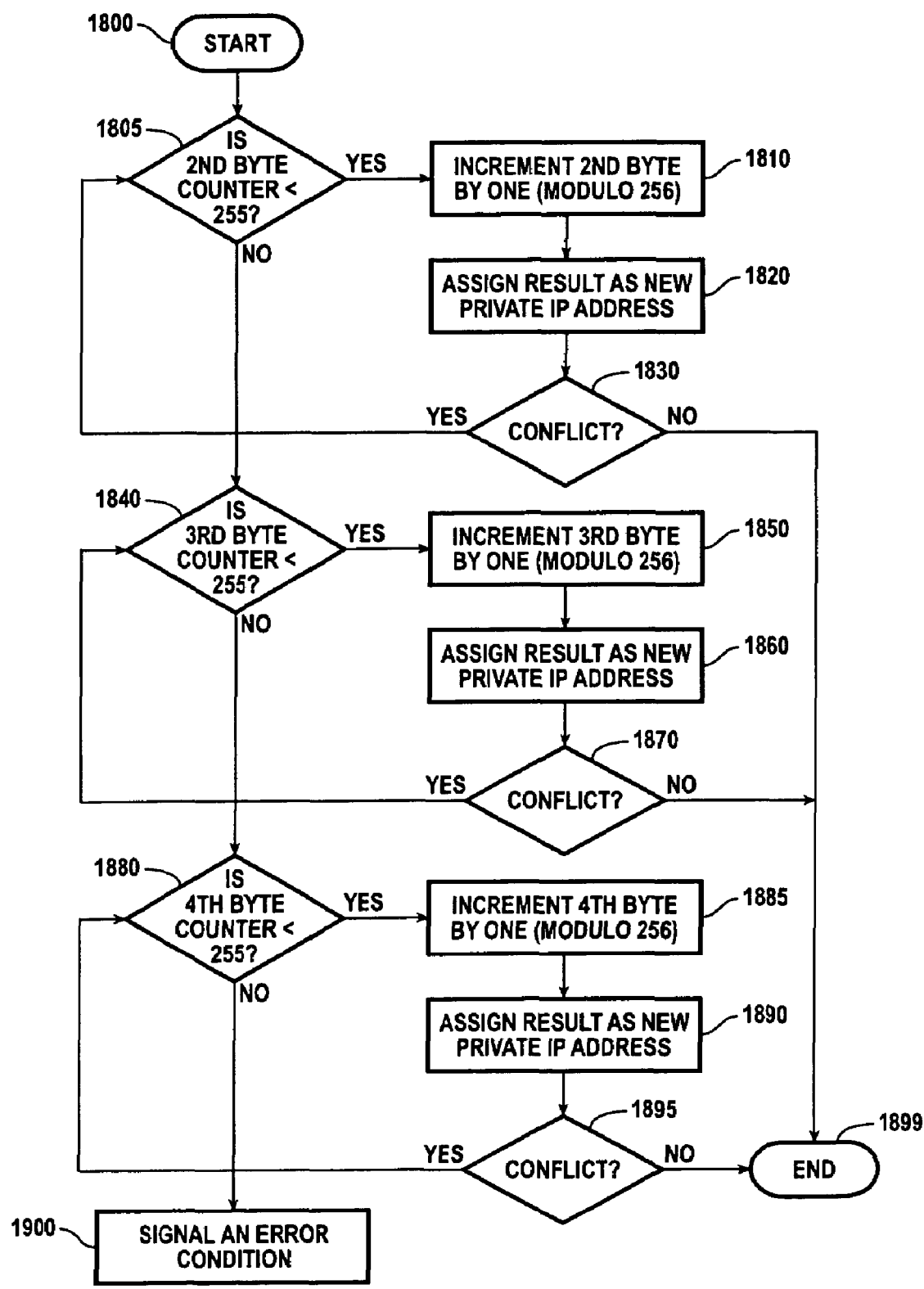
FIG. 18 is a flow chart illustrating an automatic IP address conflict correction algorithm according to one embodiment of the present invention.

FIG. 18 is a flow chart illustrating an automatic IP address conflict correction algorithm according to one embodiment of the present invention. In this embodiment, after detecting the conflict, the commander switch generates a new CMP address according to the algorithm shown in FIG. 18. First, at step 1800, three counters are initialized to zero, each representing the number of address correction attempts for the second byte, third byte, and fourth byte of the IP address, respectively. Next, at step 1805, the value of the second byte counter is compared to the highest possible value (255). If the value is less than 255, then at step 1810, the second byte of the IP address is incremented by one, "modulo 256," such that the number wraps back to zero if the present number is 255 and the second byte counter is less than 255. At step 1820, a new CMP address corresponding to the result is assigned to the switch that caused the conflict. At step 1830, if a conflict is still detected, the algorithm loops back to step 1805. Otherwise, the algorithm terminates at step 1899.

If at step 1805 the value of the second byte counter is determined to be greater than or equal to 255, then at step 1840, the third byte counter is compared to the highest possible value (255). If the value is less than 255, then at step 1850, the third byte of the IP address is incremented by one, "modulo 256," such that the number wraps back to zero if the present number is 255 and the third byte counter is less than 255. At step 1860, a new CMP address corresponding to the result is assigned to the switch that caused the conflict. At step 1870, if a conflict is still detected, the algorithm loops back to step 1840. Otherwise, the algorithm terminates at step 1899.

If at step 1840 the value of the third byte counter is determined to be greater than or equal to 255, then at step 1880, the fourth byte counter is compared to the highest possible value (255). If the value is less than 255, then at step 1885, the third byte of the IP address is incremented by one, "modulo 256," such that the number wraps back to zero if the present number is 255 and the fourth byte counter is less than 255. At step 1890, a new CMP address corresponding to the result is assigned to the switch that caused the conflict. At step 1895, if a conflict is still detected, the algorithm loops back to step 1880. Otherwise, the algorithm terminates at step 1899.

If at step 1880, the value of the fourth byte counter is determined to be greater than or equal to 255 and there is still a conflict, then the algorithm proceeds to step 1900, where an error condition is declared, meaning that the conflict could not be resolved. However, the probability of such an error condition occurring is extremely low, as discussed below.

In the embodiment described above and illustrated in FIG. 18, a total of (256*3), i.e., 768, different IP address combinations are attempted, including the originally-assigned IP address that caused the conflict. Thus, for example, if the original generated CMP address is "10.x.y.z," then the next CMP addresses attempted are "10.x+1.y.z," "10.x+2.y.z," . . . , "10.((x+255)mod256).y.z," "10.x.y+1.z," "10.x.y+2.z," . . . , "10.x.((y+255)mod256).z," "10.x.y.z+1," "10.x.y.z+2," . . . , "10x.y.((z+255)mod256)." This method has proven to be satisfactory in field tests. However, those skilled in the art will realize that many other methods for attempting new IP address combinations may be implemented, depending on the requirements of each particular application. For example, a method in which (256^3), i.e., 16,777,216, different IP addresses are attempted may be implemented by "nesting" the incrementing loops of each byte of the IP address. In other words, this can be implemented by first incrementing the second byte of the IP address up to 256 different times, then incrementing the third byte by one and then incrementing the second byte of the IP address up to 256 different times again. This part of the method alone will result in (256^2), i.e., 65,536, attempts. If a conflict is still detected, then the fourth byte may be incremented by one, whereupon the process of incrementing the second byte, then the third byte, may be repeated, thus resulting in a total of (256^3), i.e., 16,777,216, different IP address combinations.

Other address correction methods may be employed by those skilled in the art within the spirit of the present invention. After generating the new CMP address, the commander switch uses the CMP/RARP protocol to assign the new address to the switch whose CMP address caused a conflict.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A member network device capable of interconnecting at least two network segments and forwarding data frames from one network segment to another, the member network device comprising:
   conflict detection logic configured to detect a conflict between a private network address automatically assigned to the member network device by a commander network device and a network address being used by a network device other than the member network device;
   wherein the private network address automatically assigned to the member network device is a function of a hardware address of the member network device;
   wherein the conflict detection logic includes monitoring logic configured to monitor a source network address of input network packets received by the member network device.

2. The member network device of claim 1, wherein the hardware address is a Media Access Control (MAC) address.

3. The member network device of claim 1, wherein the commander network device is a local area network (LAN) switch.

4. The member network device of claim 3, wherein the member network device is a LAN switch.

5. The member network device of claim 1, wherein the private network address automatically assigned to the member network device is obtained by adding values of one or more bytes of the hardware address of the member network device to a base private network address.

6. The member network device of claim 1, wherein the monitoring logic is further configured to generate an address conflict detection message if the source network address of an input network packet received by the member network device matches the private network address of the member network device.

7. A commander network device operatively coupled to a member network device, the commander network device having a public network address and comprising:
   hardware address reading logic configured to read a hardware address of the member network device;
   private network address generation logic operatively coupled to the hardware address reading logic and configured to generate a private IP address for the member network device as a function of the hardware address; and
   private network address assigning logic operatively coupled to the private network address generation logic and configured to assign the private IP address to the member network device such that the member network device detects a conflict between the assigned private IP address and a network address being used by a network device other than the member network device.

8. The commander network device of claim 7, wherein the hardware address is a Media Access Control (MAC) address.

9. The commander network device of claim 7, wherein the commander network device is a local area network (LAN) switch.

10. The commander network device of claim 9, wherein the member network device is a LAN switch.

11. The commander network device of claim 7, wherein the private network address generation logic is further configured to generate the private network address by adding values of one or more bytes of the hardware address of the member network device to a base private network address.

12. A method for assigning network addresses to network devices in a cluster, each of the network devices being capable of interconnecting at least two network segments and forwarding data frames from one network segment to another, the method comprising:
   reading the hardware address of a first network device;
   generating a private network address as a function of the hardware address;
   assigning the private network address to the first network device; and
   communicating with the first network device using the private network address in a manner such that the first network device detects a conflict between the assigned private network address and a network address being used by a network device other than the first network device.

13. The method of claim 12, wherein the private network address is automatically generated by adding the values of one or more bytes of the hardware address to a base private network address.

14. An apparatus for assigning network addresses to network devices in a cluster, each of the network devices being capable of interconnecting at least two network segments and forwarding data frames from one network segment to another, the apparatus comprising:

means for reading the hardware address of a first network device;

means for generating a private network address as a function of the hardware address;

means for assigning the private network address to the first network device; and means for communicating with the first network device using the private network address in a manner such that the first network device detects a conflict between the assigned private network address and a network address being used by a network device other than the first network device.

15. The method of claim 14, wherein the private network address is automatically generated by adding the values of one or more bytes of the hardware address to a base private network address.

\* \* \* \* \*